Inventor
William C. Sealey
by Joseph E. Kerwin
Attorney

United States Patent Office 2,713,126
Patented July 12, 1955

2,713,126

CURRENT RESPONSIVE SYSTEM EMPLOYING LEAKAGE FLUX RESPONSIVE WINDING MEANS AND A MONOCYCLIC SQUARE

William C. Sealey, Wauwatosa, Wis., assignor to Allis-Chalmers Manufacturing Company, Milwaukee, Wis.

Application May 25, 1953, Serial No. 356,996

5 Claims. (Cl. 307—103)

This invention relates in general to current responsive systems and more specifically to an improved current responsive system to supply a control current to a line drop compensator.

Frequently, in voltage distribution systems it becomes necessary to regulate the voltage supplied to a load which is connected to the system at a point remote from the source of supply voltage. If the system is supplied by a transformer, the latter is usually constructed so that the voltage supplied to the system may be regulated depending upon the requirements of the load. Regulation is accomplished by means of a step type voltage regulator whose operation is controlled by an electroresponsive device which must be located close to the regulator but connected to measure the voltage of the system accurately at some predetermined point which is often many miles away from the transformer installation. It therefore becomes necessary to compensate for the voltage drop of the line between the load and the transformer caused by the load current. Since this voltage drop varies as the current in the line is varied by changes in load, a fixed compensation is not possible.

One well known manner of obtaining accurate measurements of the voltage at a point remote from the supply is to connect the electroresponsive device across the conductors of the load circuit at a point relatively close to the transformer. An adjustable impedance device, comprising a variable resistance member and a variable reactance member, is inserted in series with the electroresponsive device and the members are adjusted to simulate the respective percentages of resistance and reactance of the circuit between the transformer and the point at which the voltage is to be measured. A current transformer is positioned on the line near the transformer and suitably connected across the impedance element so that the current in the secondary of the current transformer causes a voltage drop across the impedance that is proportional to the voltage drop of the line caused by load current. The current transformer is connected so that the voltage drop across the impedance subtracts from the voltage supplied from the load conductors so that the resultant voltage applied to the electroresponsive device represents the voltage at the point remote from the supply.

This compensating system is suitable for distribution systems where the supply voltage of the transformer is relatively low. However, where relatively high voltages are used the problem of insulating the current transformer from ground becomes serious and cannot be solved without increasing the insulation on the current transformer, resulting in increased cost and size of the installation.

It has been found in accordance with this invention that an improved current responsive system, which eliminates the need of a current transformer, may be provided for supplying a control current to a line drop compensator. This system comprises measuring windings disposed on the core of the supply transformer so that the leakage flux caused by the load current generates a voltage in the measuring windings which is then applied across the constant voltage terminals of a monocyclic square that has its constant current terminals connected across an adjustable impedance element. Since leakage flux is proportional to load current, the voltage generated in the measuring winding by the leakage flux causes a current to be supplied to the variable impedance which causes a voltage drop therein proportional to that in the line.

It is therefore an object of the present invention to provide an improved alternating current responsive system.

Another object of the present invention is to provide an improved current responsive system which eliminates the need for a highly insulated current transformer.

Objects and advantages other than those mentioned above will become apparent from the following description when read in connection with the drawings in which.

Figure 1:
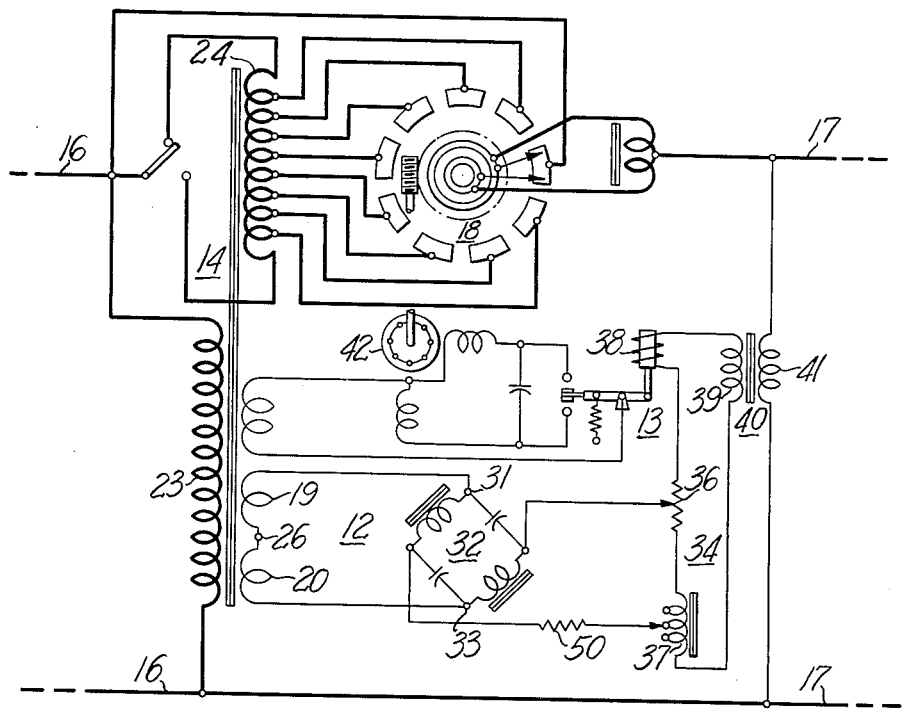
Fig. 1 shows schematically the current responsive system embodying the present invention used as a line drop compensator for an electroresponsive device which controls the regulation of a voltage distribution system.

The system shown in Fig. 1 comprises generally the current responsive system 12 connected as a line drop compensator for electroresponsive device 13 which controls the operation of regulating transformer 14. Transformer 14 regulates the voltage supplied to a load circuit 17 from a supply circuit 16 by means of the tap changing mechanism 18.

Figure 2:
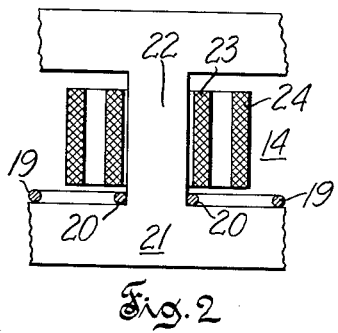
Fig. 2 is a sectional view showing the position of the measuring windings on the transformer shown schematically in Fig. 1.

Current responsive system 12 comprises coaxial measuring windings 19 and 20 of different diameters which are disposed on transformer 14. Transformer 14, shown in partial section in Fig. 2, comprises a magnetic core 21 having a leg portion 22 upon which at least a part of the primary winding 23 and of the secondary winding 24 are suitably wound. Measuring windings 19 and 20 are disposed coaxially on core 21 so that one of these windings is influenced by the component of leakage flux of transformer 14 caused by load current flowing in circuit 17. The term leakage flux as used refers to the flux which encircles one of the measuring windings but does not encircle the other measuring winding. Winding 20 is positioned on core 21 in close proximity to leg portion 22 and is influenced substantially only by the flux which flows in the core. Winding 19 has a greater diameter than winding 20 and is positioned so that it is influenced by the flux in the core and also the component of leakage flux caused by load current. Since leakage flux does not encircle measuring winding 19 but does encircle measuring winding 20, voltages are induced in these windings which are different, the difference being proportional to the leakage flux. Winding 19 is connected between a common terminal 26 and input terminal 31 of a monocyclic square 32, and winding 20 is connected between terminal 26 and input terminal 33 of monocyclic square 32. The voltage applied to the input terminals of monocyclic square 32 is thus proportional to load current.

The output terminals of monocyclic square 32 are connected in series with resistor 50 across a variable impedance element 34 which comprises an adjustable resistor 36 and an adjustable reactor 37. Impedance element 34 is connected in series with the coil 38 of device 13 and with secondary winding 39 of a potential transformer 40 which has its primary winding 41 connected across the conductors of circuit 17. Device 13 is shown as a contact making voltmeter but may be any electro-responsive device suitable to cause operation of the tap changing mechanism 18 of regulating transformer 14.

The operation of the current responsive system when used to supply a control current to the line drop compensator in the voltage distribution system shown in Fig. 1 is as follows. Assume that it is desired to maintain the voltage between the conductors of circuit 17 relatively constant at some predetermined point which is remote from the transformer installation, for supplying a load with constant voltage of a desired value. Assume further the system is not energized and the tap changing mechanism 18 of transformer 14 is in the zero tap position.

On being energized, the conductors of circuit 17 have essentially the same voltage as supply circuit 16 since the tap changing mechanism is in the zero tap position. The contact making voltmeter is supplied with a voltage from secondary winding 39 of potential transformer 40, this voltage being directly proportional to the voltage between conductors of circuit 17. Windings 19, 20 are so wound that the voltages induced therein by the main flux of transformer 14 cancel out. Since no current is flowing in circuit 17 the leakage flux of main transformer 14 is negligible and does not react appreciably on measuring winding 19. Therefore the current supplied to impedance element 34 from monocyclic square 32 is also substantially zero.

However, when the load is connected to circuit 17 at the predetermined point a current flows in the lines resulting in a drop in voltage along the line from the transformer 14 to the load. This load current causes in transformer 14 a leakage flux which is proportional to itself, resulting in a voltage proportional to the leakage flux being supplied to the input terminals of monocyclic square 32. This voltage causes a control current proportional to the load current to be supplied to impedance element 34. Varying the impedance of element 34 does not change the value of the control current since monocyclic square 32 supplies a constant current to its output terminals regardless of the impedance across the output terminals. By adjusting resistance member 36 and reactance 37, the ratio of the voltage drop across the impedance element to the voltage supplied from secondary winding 39 of potential transformer 40 may therefore be made equal to the ratio of the voltage drop in the line to the voltage between the conductors of circuit 17 at the point where primary winding 41 of potential transformer 40 is connected. Once element 34 is adjusted these ratios remain equal because the voltage drop across the impedance is directly proportional to the voltage drop in the line caused by the load current.

If the load is moved to another predetermined point further from the transformer so that the voltage drop in the line increases, the respective taps on resistor 36 and reactor 37 may be separated further to cause a larger voltage drop across element 34 thereby compensating for the increased line drop.

The voltage applied to coil 38 of device 13 is proportional to the voltage at the predetermined point where the load is connected. Device 13 maintains the voltage at the load at the desired value for which it has been set by selectively energizing the tap changer motor 42 to vary the voltage being supplied to load circuit 17. When the desired value of voltage is reached the motor is deenergized by device 13.

While only one embodiment of the present invention has been shown and described, it will be apparent to those skilled in the art that modifications may be made therein without departing from the spirit of the invention or the scope of the appended claims.

It is claimed and desired to secure by Letters Patent:

1. A current responsive system comprising a transformer, winding means comprising first and second measuring windings disposed on said transformer to provide a voltage in said winding means proportional to flux which encircles said first winding but does not encircle said second winding, an impedance element, a monocyclic square having input terminals and output terminals, means connecting said input terminals to said winding means, and means connecting said impedance element to said output terminals to supply to said impedance element a current proportional to said flux, and independent of the impedance of said impedance element.

2. A current responsive system comprising a main transformer, winding means comprising two coaxial measuring windings of different diameters disposed on said main transformer, a monocyclic square having input and output terminals, means connecting said winding means to said input terminals, an impedance element, and means connecting said impedance element to said output terminals to cause a current to be supplied to said impedance element proportional to the leakage flux of said transformer which encircles one of said measuring windings but does not encircle the other of said measuring windings, said current being independent of the impedance of said impedance element.

3. A line drop compensator comprising in combination a variable impedance element and a current responsive system, said system comprising a main transformer, winding means comprising two coaxial measuring windings of different diameters disposed on said main transformer, said measuring windings each having one end connected to a common terminal, a monocyclic square having input and output terminals, means for connecting the other ends of said measuring windings to said input terminals, and means connecting said variable impedance element to said output terminals to cause a current to be supplied to said impedance element proportional to the leakage flux of said main transformer which encircles one of said measuring windings but does not encircle the other of said measuring windings, said current being independent of the impedance of said impedance element.

4. A line drop compensating system comprising in combination an alternating current circuit, a main transformer connected to said circuit to supply to said circuit an alternating voltage, a voltage responsive device and means to supply to said device a voltage corresponding to the value of the voltage of said circuit at a point a predetermined distance from said transformer, said means comprising a potential transformer having a primary winding connected to said circuit intermediate said point and said main transformer and a secondary winding connected to said device, a variable impedance element connected in series with said secondary winding and with said device, and means to supply to said impedance element a control current proportional to the current in said circuit to cause a voltage drop across said impedance element proportional to the voltage drop in said circuit between said point and said transformer, said current supply means comprising two coaxial measuring windings of different diameters disposed on said main transformer, said measuring windings each having one end connected to a common terminal, a monocyclic square having input and output terminals, means for connecting the other ends of said measuring windings to said input terminals, and means connecting said impedance element to said output terminals to supply to said impedance element a control current proportional to the leakage flux of said main transformer which encircles one of said measuring windings but does not encircle the other of said windings, said control current being independent of the impedance of said impedance element.

5. In combination, a transformer, an alternating current circuit connected to said transformer, a voltage measuring device, line drop compensating means including an impedance element for modifying the energization of said device in accordance with the line drop between said transformer and a predetermined point of said circuit the voltage of which said device measures, winding means on said transformer for providing a voltage proportional to the current in said circuit, and a monocyclic square having voltage terminals connected to said winding means and constant current terminals connected to said element to cause a control current to be supplied to said element proportional to said current in said alternating current circuit, said control current being independent of the impedance of said element.

References Cited in the file of this patent

UNITED STATES PATENTS

| | | |
|---|---|---|
| 2,069,825 | Farkas et al. | Feb. 9, 1937 |
| 2,148,301 | Kuyper | Feb. 21, 1939 |
| 2,325,936 | Blume | Aug. 3, 1943 |